(12) United States Patent
Watanabe et al.

(10) Patent No.: US 11,440,500 B2
(45) Date of Patent: Sep. 13, 2022

(54) VEHICLE OCCUPANT RESTRAINT STRUCTURE

(71) Applicant: TOYOTA JIDOSHA KABUSHIKI KAISHA, Aichi-ken (JP)

(72) Inventors: Jumpei Watanabe, Nagakute (JP); Yasuhiro Hara, Nagoya (JP); Norimasa Koreishi, Miyoshi (JP); Hirotaka Ishioka, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/167,086

(22) Filed: Feb. 4, 2021

(65) Prior Publication Data

US 2021/0245702 A1    Aug. 12, 2021

(30) Foreign Application Priority Data

Feb. 10, 2020   (JP) .............................. JP2020-020949

(51) Int. Cl.
| | |
|---|---|
| B60R 22/24 | (2006.01) |
| B60R 22/12 | (2006.01) |
| B62D 25/02 | (2006.01) |
| B62D 25/06 | (2006.01) |
| B62D 25/20 | (2006.01) |
| B60R 21/02 | (2006.01) |
| B60R 22/34 | (2006.01) |

(52) U.S. Cl.
CPC ............ B60R 22/24 (2013.01); B60R 21/026 (2013.01); B60R 22/12 (2013.01); B62D 25/02 (2013.01); B62D 25/06 (2013.01); B62D 25/2036 (2013.01); B60R 22/34 (2013.01)

(58) Field of Classification Search
CPC ......... B60R 22/24; B60R 22/12; B60R 22/34; B60R 21/026; B60R 22/18; B60R 22/26; B62D 25/02; B62D 25/06; B62D 25/2036; B62D 33/06
USPC ...................................................... 280/801.1
See application file for complete search history.

(56) References Cited

U.S. PATENT DOCUMENTS

| | | | |
|---|---|---|---|
| 6,286,882 B1* | 9/2001 | Rastetter ................. | F41H 7/048 296/24.41 |
| 7,195,297 B2* | 3/2007 | Murray ..................... | B60R 7/14 296/24.42 |
| 7,806,452 B2* | 10/2010 | Storer ..................... | B60R 21/12 280/749 |
| 7,909,379 B2* | 3/2011 | Winget ................. | B60R 21/026 410/129 |
| 8,651,525 B2* | 2/2014 | Kaku ...................... | B60R 22/34 280/808 |

(Continued)

FOREIGN PATENT DOCUMENTS

| | | |
|---|---|---|
| DE | 4438234 A1 | 5/1995 |
| EP | 1574390 A1 | 9/2005 |

(Continued)

*Primary Examiner* — Paul N Dickson
*Assistant Examiner* — Caitlin Anne Miller
(74) *Attorney, Agent, or Firm* — Hauptman Ham, LLP

(57) ABSTRACT

A partition portion that partitions a cabin in a front-rear direction of a vehicle is disposed on a vehicle rear side with respect to a seat. A restraint device is partially attached to the partition portion, and a webbing of the restraint device is withdrawn from a partition portion side.

8 Claims, 6 Drawing Sheets

(56) References Cited

U.S. PATENT DOCUMENTS

| | | | |
|---|---|---|---|
| 8,998,283 B1* | 4/2015 | Yamamoto | B60R 5/04 |
| | | | 280/756 |
| 9,616,844 B2* | 4/2017 | Karube | B60R 22/24 |
| 9,643,477 B2* | 5/2017 | Mochizuki | B60R 21/026 |
| 10,239,425 B2* | 3/2019 | Bryant | B60N 2/062 |
| 2003/0141731 A1* | 7/2003 | Betts | B60N 2/305 |
| | | | 296/24.43 |
| 2016/0090062 A1* | 3/2016 | Karube | B60R 22/24 |
| | | | 280/807 |
| 2021/0245815 A1* | 8/2021 | Watanabe | B62D 25/04 |
| 2021/0380062 A1* | 12/2021 | Matijevich | B60R 21/026 |
| 2022/0126773 A1* | 4/2022 | Yagi | B60N 2/012 |

FOREIGN PATENT DOCUMENTS

| | | | | |
|---|---|---|---|---|
| EP | 3275739 A1 * | 1/2018 | | B60R 21/13 |
| JP | 2013511437 A | 4/2013 | | |
| JP | 201668840 A | 5/2016 | | |
| JP | 201688157 A | 5/2016 | | |
| JP | 2019151196 A | 9/2019 | | |
| JP | 2019172040 A | 10/2019 | | |
| WO | 2011061585 A2 | 5/2011 | | |
| WO | 2019115461 A1 | 6/2019 | | |

\* cited by examiner

VEHICLE OCCUPANT RESTRAINT STRUCTURE

CROSS-REFERENCE TO RELATED APPLICATION

This application claims priority to Japanese Patent Application No. 2020-020949 filed on Feb. 10, 2020, incorporated herein by reference in its entirety.

BACKGROUND

1. Technical Field

The disclosure relates to a vehicle occupant restraint structure.

2. Description of Related Art

Japanese Unexamined Patent Application Publication No. 2019-172040 (JP 2019-172040 A) discloses a disclosure relating to a vehicle occupant restraint device. The occupant restraint device can restrain an occupant seated on a vehicle seat and protect the occupant when braking is applied to a vehicle or a collision load is input to the vehicle.

SUMMARY

However, in the related art above, the webbing is withdrawn from a center pillar constituting a part of a side portion of a vehicle body. Therefore, it is necessary to provide the vehicle seat in the vicinity of the side portion of the vehicle body. That is, in the related art above, there is room for improvement in ensuring the flexibility to lay out a position of the vehicle seat.

The disclosure provides a vehicle occupant restraint structure capable of restraining the occupant seated on the vehicle seat while ensuring the flexibility to lay out the position of the vehicle seat.

A vehicle occupant restraint structure according to an aspect of the disclosure includes: a vehicle seat provided in a cabin; a partition portion that is disposed on a vehicle rear side with respect to the vehicle seat and partitions the cabin in a front-rear direction of a vehicle; and a restraint device that is partially attached to the partition portion, includes a webbing that is withdrawable from a partition portion side, and allows an occupant seated on the vehicle seat to be restrained.

With the configuration above, the vehicle seat is disposed in the cabin, and the occupant is seated on the vehicle seat. The occupant seated on the vehicle seat is restrained by the restraint device.

In the configuration in which the webbing of the restraint device is withdrawn from the side portion side of the vehicle body, the vehicle seat needs to be disposed in the vicinity of the side portion of the vehicle body. Accordingly, it becomes difficult to ensure the flexibility to lay out the position of the vehicle seat.

Here, according to the aspect of the disclosure, the partition portion for partitioning the cabin in the front-rear direction of the vehicle is disposed on the vehicle rear side with respect to the vehicle seat. The restraint device is partially attached to the partition portion, and the webbing of the restraint device is withdrawn from the partition portion side.

Therefore, even when the vehicle seat is distant away from the side portion of the vehicle body, the occupant seated on the vehicle seat can be restrained by the webbing of the restraint device.

The partition portion may be provided to bridge between a roof panel and a floor panel in an up-down direction of the vehicle, the roof panel constituting a portion of the cabin on a vehicle upper side and the floor panel constituting a portion of the cabin on a vehicle lower side. The vehicle occupant restraint structure may further include a first pillar portion that is disposed on a first side of the partition portion in a width direction of the vehicle and extends in the up-down direction of the vehicle, a second pillar portion that is disposed on a second side of the partition portion in the width direction of the vehicle and extends in the up-down direction of the vehicle, an upper cross portion that is connected to the first pillar portion and the second pillar portion directly or via first members, extends in the width direction of the vehicle, and reinforces the roof panel, and a lower cross portion that is connected to the first pillar portion and the second pillar portion directly or via second members, extends in the width direction of the vehicle, and reinforces the floor panel.

As described above, the occupant seated on the vehicle seat can be restrained while ensuring the flexibility to lay out the position of the vehicle seat.

With this configuration, the partition portion is provided to bridge between the roof panel and the floor panel in the up-down direction of the vehicle. The roof panel constitutes a portion of the cabin on the vehicle upper side and the floor panel constitutes a portion of the cabin on the vehicle lower side. Therefore, the load input from the vehicle seat side via the restraint device is transmitted to the roof panel and the center floor panel via the partition portion.

Further, the first pillar portion extending in the up-down direction of the vehicle is disposed on the first side of the partition portion in the width direction of the vehicle, and the second pillar portion extending in the up-down direction of the vehicle is disposed on the second side of the partition portion in the width direction of the vehicle. Further, the roof panel is reinforced by the upper cross portion extending in the width direction of the vehicle, and the upper cross portion is attached to the first pillar portion and the second pillar portion directly or via members. Further, the floor panel is reinforced by the lower cross portion extending in the width direction of the vehicle, and the lower cross portion is attached to the first pillar portion and the second pillar portion directly or via members. Therefore, the cabin is configured to include an annular structural portion that is annular when viewed from the front-rear direction of the vehicle.

Here, the partition portion and the annular structural portion above are continuous, and an inertial force generated to the occupant is transmitted to the annular structural portion via the restraint device and the partition portion and supported.

As described above, the occupant seated on the vehicle seat can be restrained by the restraint device in a stable state.

The vehicle seat may be disposed on a center side of the cabin in the width direction of the vehicle, and the vehicle occupant restraint structure may further include a support portion that supports the vehicle seat with respect to the partition portion. The restraint device may include a retractor and a buckle, the retractor being attached to the partition portion and from which a webbing is withdrawable, and the buckle being attached to the vehicle seat or the support portion.

With this configuration, the vehicle seat is disposed on the center side of the cabin in the width direction of the vehicle, and the vehicle seat is supported by the support portion with respect to the partition portion. Further, the restraint device includes the retractor that allows the webbing to be withdrawn, and the buckle that allows the tongue plate provided on the webbing to be engaged. The retractor is attached to the partition portion, and the buckle is attached to the seat support portion.

Therefore, even when the vehicle seat is disposed on the center side of the cabin in the width direction of the vehicle, the retractor and the buckle of the restraint device are disposed in the vicinity of the vehicle seat such that the webbing of the restraint device can restrain the occupant seated on the vehicle seat in a stable state.

The partition portion may include a partition panel that has a plate shape extending in a width direction and in an up-down direction of the vehicle and is provided to bridge between a roof panel and a floor panel in the up-down direction of the vehicle, the roof panel constituting a portion of the cabin on a vehicle upper side and the floor panel constituting a portion of the cabin on a vehicle lower side. The restraint device may be partially attached to the partition panel. The partition panel may partition the cabin into a driver compartment and a passenger compartment, each of which includes the vehicle seat.

The vehicle occupant restraint structure may further include a reinforcement member that reinforces a partition panel and extends in an up-down direction of the vehicle.

The reinforcement member may constitute, with the partition panel, a closed sectional structure in which a section as viewed in the up-down direction of the vehicle is closed and that extends in the up-down direction of the vehicle.

A pair of partition panels may be provided and the partition panels may be disposed at an interval from each other in the front-rear direction of the vehicle.

Therefore, the occupant seated on the vehicle seat can be restrained by the restraint device in a stable state in the configuration in which the vehicle seat is disposed on the center side of the cabin in the width direction of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an example of an embodiment of a vehicle occupant restraint structure according to the disclosure will be described with reference to FIGS. 1 to 6. Note that, an arrow FR indicates a front side in a front-rear direction of the vehicle, an arrow UP indicates a vehicle upper side, and an arrow LH indicates a left side in a width direction of the vehicle, which are appropriately shown in each drawing.

Figure 6:
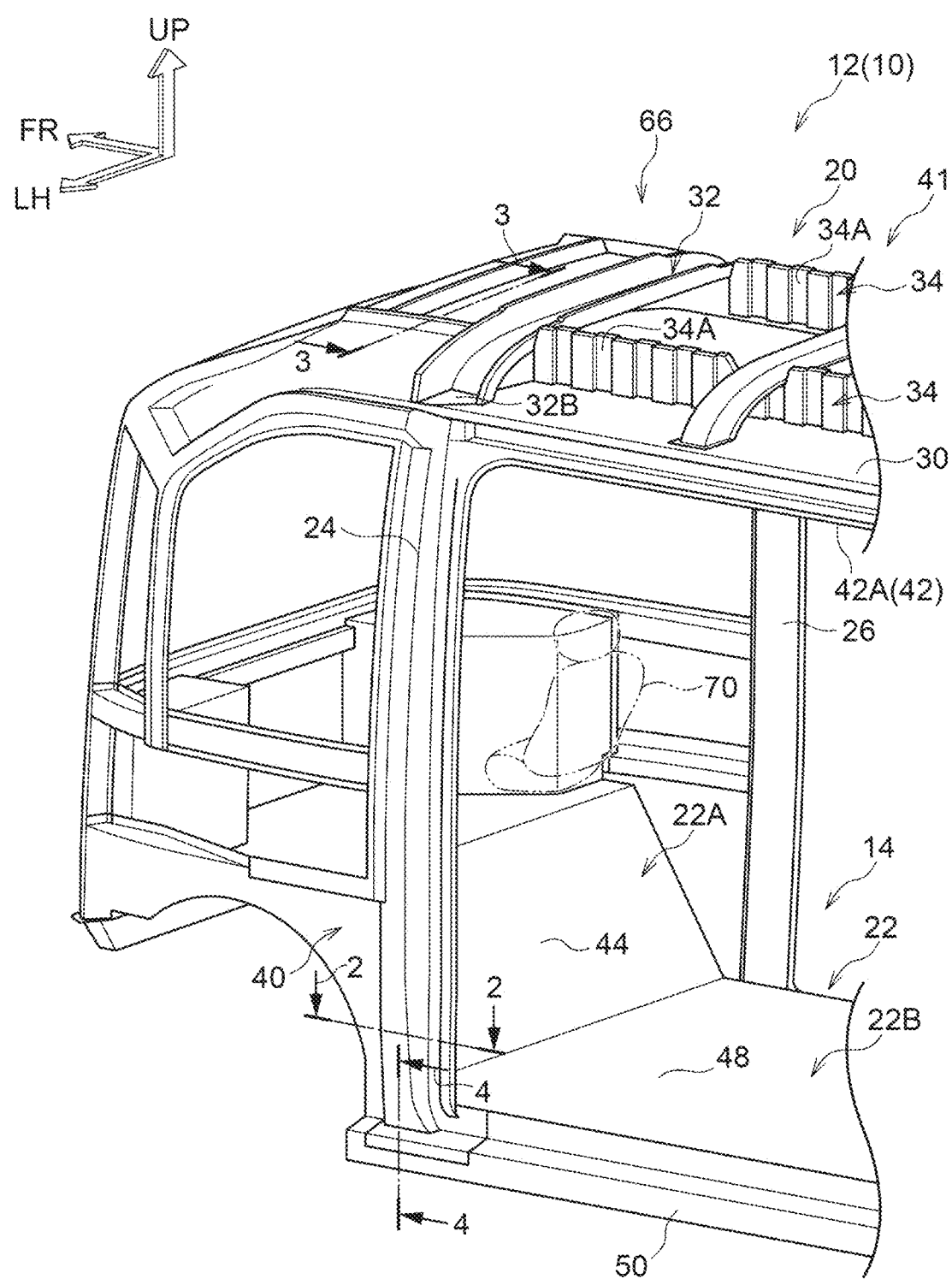
FIG. 6 is a perspective view schematically showing a configuration of the vehicle body of the vehicle to which the vehicle occupant restraint structure according to the embodiment is applied.

As shown in FIG. 6, a vehicle 10 to which the vehicle occupant restraint structure according to the embodiment is applied includes a vehicle body 12 made of steel and a frame (not shown) that is made of steel and supports the vehicle body 12, which collectively constitute a so-called frame structure.

Figure 1:
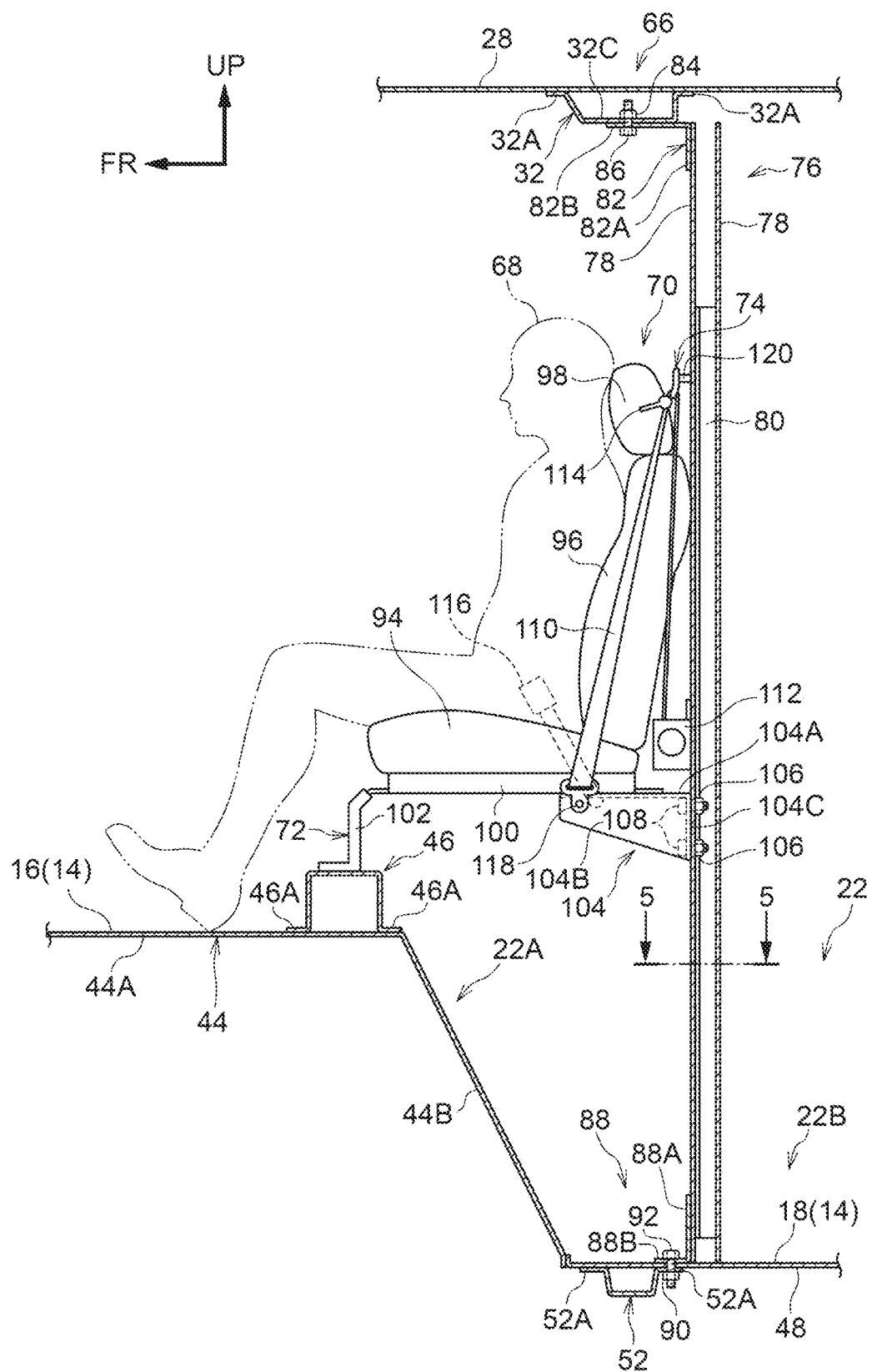
FIG. 1 is a sectional view schematically showing a configuration of a cabin of a vehicle to which a vehicle occupant restraint structure according to an embodiment is applied, as viewed from a width direction of the vehicle.

The vehicle body 12 has a box shape having a substantially rectangular parallelepiped shape extending in the front-rear direction of the vehicle, and is basically symmetrical with respect to a central line CL (see FIG. 5) extending in the front-rear direction of the vehicle. The vehicle body 12 constitutes a main part of a cabin 14. As shown in FIG. 1, the cabin 14 is partitioned in the front-rear direction of the vehicle by a partition portion 76 that serves as a partition portion described later. A portion of the cabin 14 on a vehicle front side with respect to the partition portion 76 serves as a driver compartment 16, and a portion of the cabin 14 on a vehicle rear side with respect to the partition portion 76 serves as a passenger compartment 18.

The vehicle body 12 is configured to include a roof portion 20 constituting a portion of the cabin 14 on a vehicle upper side, a floor portion 22 constituting a portion of the cabin 14 on a vehicle lower side, a first pillar portion 24 and a second pillar portion 26 that connect the roof portion 20 and the floor portion 22 in the up-down direction of the vehicle.

Figure 3:
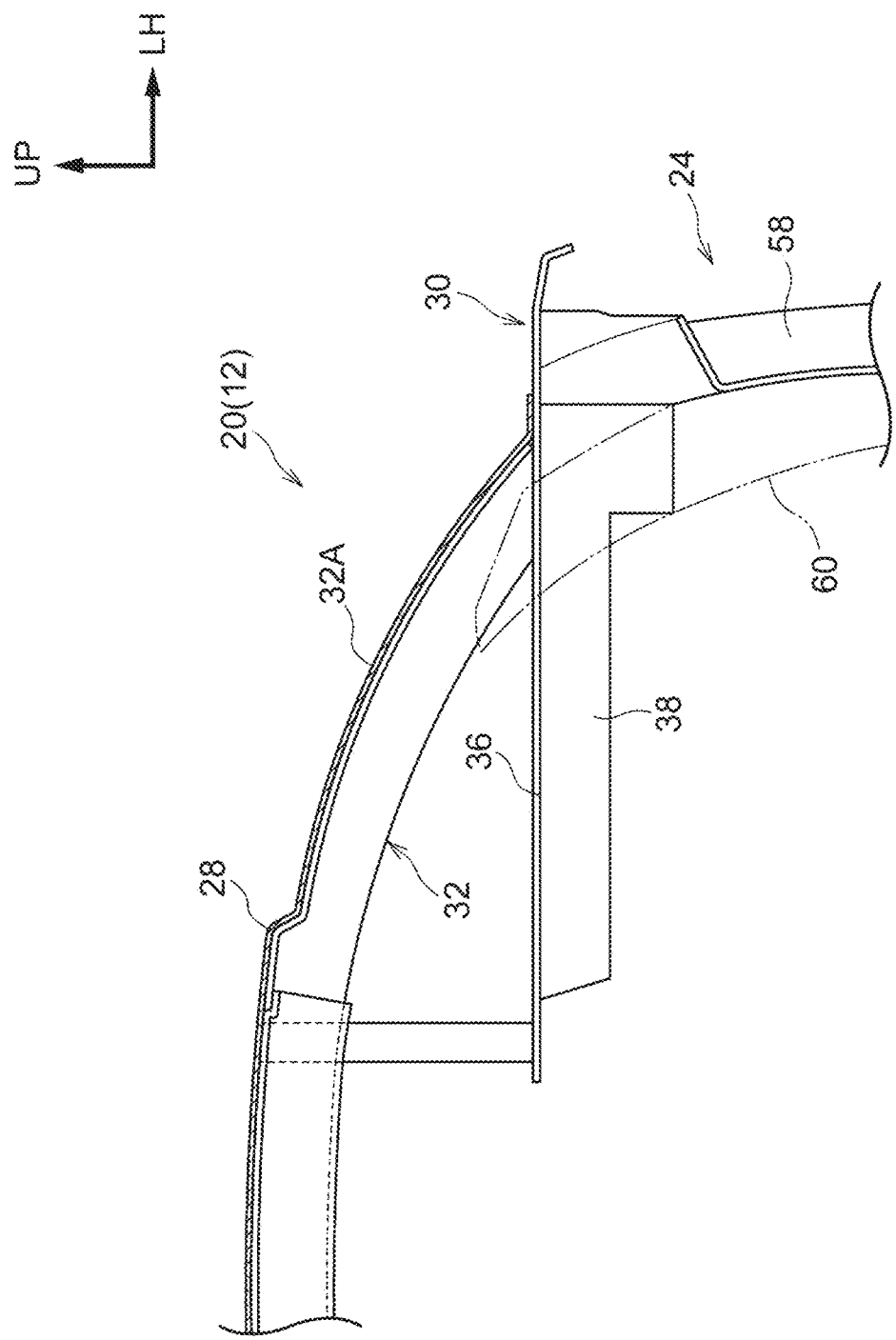
FIG. 3 is a sectional view (a sectional view taken along a line 3-3 in FIG. 6) schematically showing a configuration of a portion on a vehicle upper side in a vehicle body to which the vehicle occupant restraint structure according to the embodiment is applied, as viewed from the front-rear direction of the vehicle.

As shown in FIG. 3, the roof portion 20 is configured to include a roof panel 28 constituting an upper surface of the roof portion 20, a pair of roof side rails 30, each of which constitutes an outer portion in a width direction of the vehicle, and an upper cross portion 32 and a reinforcement panel 34 that reinforce the roof panel 28. In FIG. 6, the roof panel 28 is not shown in order to make it easier to understand the configuration of the roof side rail 30 and other parts.

The roof panel 28 has a rectangular plate shape in which a plate thickness direction is the up-down direction of the vehicle and a longer side of the rectangular shape is along the front-rear direction of the vehicle when viewed from the up-down direction of the vehicle. The roof panel 28 is curved to protrude upward in the vehicle when viewed in the front-rear direction of the vehicle.

The roof side rail 30 is disposed below the roof panel 28 in the up-down direction of the vehicle, and is configured to include a roof side rail upper part 36 that constitutes a portion of the roof side rail 30 on the vehicle upper side and a roof side rail lower part 38 that constitutes a portion of the roof side rail 30 on the vehicle lower side. The roof side rail 30 has, as its outer shape, a substantially parallelepiped shape in which a dimension in the width direction of the vehicle is longer than a dimension in the up-down direction of the vehicle, and extends in the front-rear direction of the vehicle.

An outer end portion of the roof panel 28 in the width direction of the vehicle is joined to the roof side rail upper part 36 at a joint portion (not shown) by welding, etc.

As shown in FIG. 6, the roof side rail 30 is disposed along an upper edge portion 42A of a door opening 42 provided in a side portion 40 of the vehicle body 12. A slide door (not shown) can be provided below the roof side rail 30 in the vehicle. The slide door opens and closes the door opening 42.

As shown in FIG. 3, the upper cross portion 32 is disposed below the roof panel 28 in the vehicle along the roof panel 28 and extends in the width direction of the vehicle. The upper cross portion 32 has a hat shape in which a sectional shape when viewed from the width direction of the vehicle is open upward in the vehicle. A flange portion 32A is joined to the roof panel 28 at a joint portion (not shown) by welding, etc. The upper cross portion 32 and the roof panel 28 constitute a closed sectional structure in which a section when viewed from the width direction of the vehicle is closed.

As shown in FIG. 6, a mounting piece portion 32B is provided at an outer end of the upper cross portion 32 in the width direction of the vehicle, and is joined to the roof side rail upper part 36 at a joint portion (not shown) by welding, etc.

As shown in FIG. 6, the reinforcement panel 34 extends upward in the vehicle from an inner end of the roof side rail upper part 36 in the width direction of the vehicle. The reinforcement panel 34 is provided with a plurality of protruding portions 34A extending in the width direction of the vehicle at predetermined intervals in the front-rear direction of the vehicle on each of an outer surface in the width direction of the vehicle and an inner surface in the width direction of the vehicle. An end portion of the reinforcement panel 34 on the vehicle upper side is joined to the roof panel 28 at a joint portion (not shown) by welding, etc., and an end portion of the reinforcement panel 34 on the vehicle lower side is joined to the roof side rail upper part 36 at a joint portion (not shown) by welding, etc.

As shown in FIG. 1, the floor portion 22 is configured to include a front floor portion 22A constituting a portion on the driver compartment 16 side and a center floor portion 22B constituting a portion on the passenger compartment 18 side.

The front floor portion 22A includes a front floor panel 44 and a cross member 46. More specifically, the front floor panel 44 is configured to include a front panel portion 44A constituting a portion of the front floor panel 44 on the vehicle front side, and a rear panel portion 44B constituting a portion of the front floor panel 44 on the vehicle rear side.

The front panel portion 44A has a rectangular plate shape extending in the front-rear direction and the width direction of the vehicle when viewed from the up-down direction of the vehicle. The rear panel portion 44B extends downward and rearward in the vehicle from a peripheral edge portion of the front panel portion 44A on the vehicle rear side.

A cross member 46 has a hat shape in which a sectional shape when viewed from the width direction of the vehicle is open downward in the vehicle, and extends in the width direction of the vehicle. The cross member 46 is disposed on the vehicle upper side in the portion of the front panel portion 44A on the vehicle rear side, and a flange portion 46A of the cross member 46 is joined to the front panel portion 44A at a joint portion (not shown) by welding, etc. With this configuration, the cross member 46 and the front panel portion 44A constitutes a closed sectional structure in which a section when viewed from the width direction of the vehicle is closed.

The center floor portion 22B is configured to include a center floor panel 48 serving as a floor panel, a pair of rocker panels 50, and a lower cross portion 52 as shown in FIGS. 1 and 6.

The center floor panel 48 has a plate shape extending in the front-rear direction and the width direction of the vehicle, and constitutes a floor surface on the passenger compartment 18 side. The center floor panel 48 has a peripheral edge portion on the vehicle front side being joined to the peripheral edge portion of the rear panel portion 44B on the vehicle rear side at a joint portion (not shown) by welding, etc.

Figure 4:
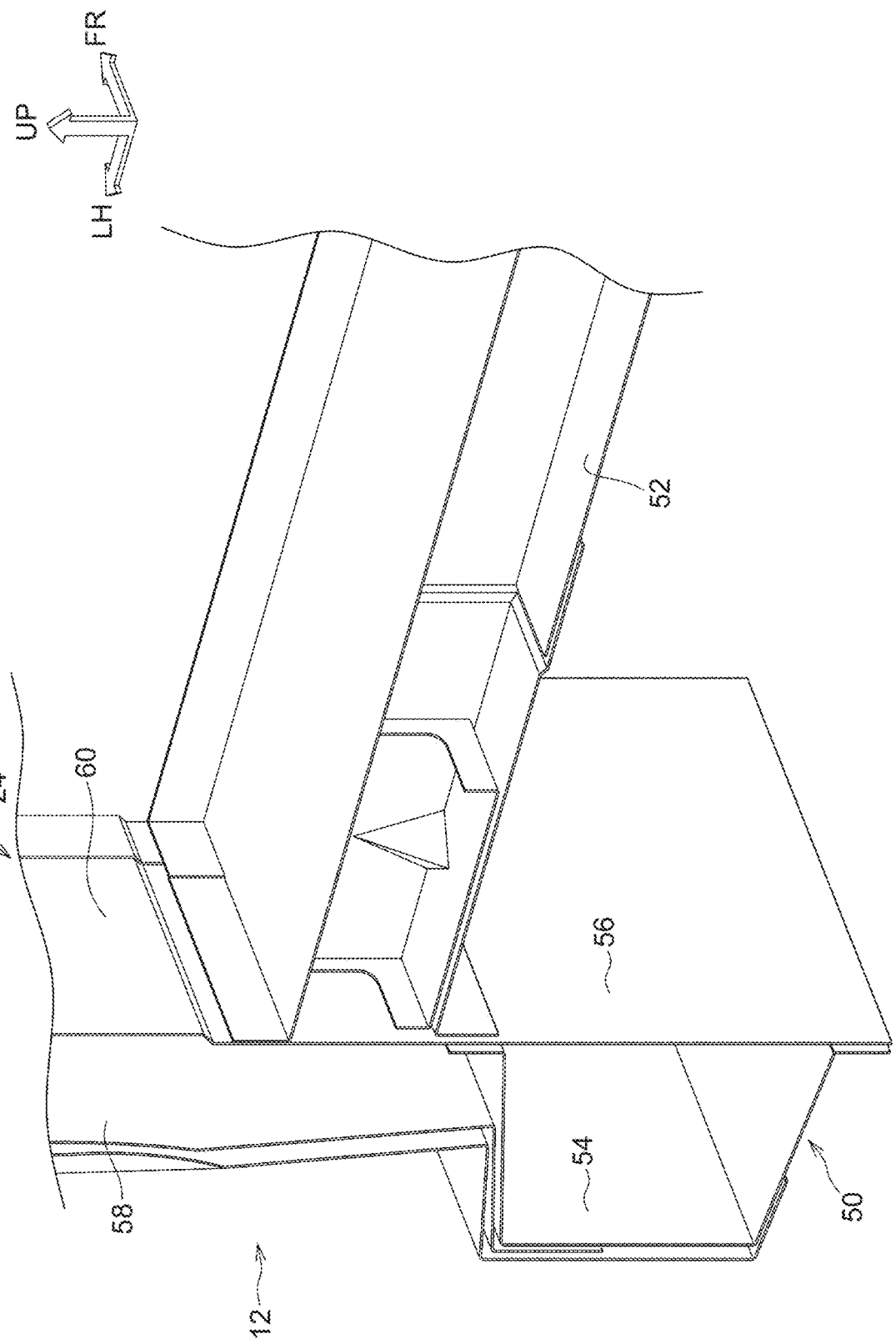
FIG. 4 is a perspective sectional view (a sectional view taken along a line 4-4 in FIG. 6) schematically showing a configuration around a pillar portion in the vehicle body of the vehicle to which the vehicle occupant restraint structure according to the embodiment is applied.

The rocker panels 50 each extend in the front-rear direction of the vehicle along an outer peripheral edge portion of the center floor panel 48 in the width direction of the vehicle. As shown in FIG. 4, the rocker panels 50 each include a rocker panel outer part 54 constituting an outer portion of the rocker panel 50 in the width direction of the vehicle and a rocker panel inner part 56 constituting an inner portion of the rocker panel 50 in the width direction of the vehicle. The rocker panels 50 each have a closed sectional structure in which a section when viewed from the front-rear direction of the vehicle is closed.

An outer end portion of the center floor panel 48 in the width direction of the vehicle is joined to an inner surface of the rocker panel inner part 56 in the width direction of the vehicle at a joint portion (not shown) by welding, etc.

As shown in FIGS. 1 and 4, the lower cross portion 52 is disposed along the peripheral edge portion of the center floor panel 48 on the vehicle front side below the center floor panel 48 in the vehicle, and disposed to overlap the upper cross portion 32 when viewed from the up-down direction of the vehicle. The lower cross portion 52 has a hat shape in which a sectional shape when viewed from the width direction of the vehicle is open upward in the vehicle and extends in the width direction of the vehicle.

A pair of flange portions 52A of the lower cross portion 52 is joined to the center floor panel 48 at a joint portion (not shown) by welding, etc. The flange portions 52A are provided on respective sides of the lower cross portion 52 in the front-rear direction of the vehicle. The lower cross portion 52 and the center floor panel 48 constitute a closed sectional structure in which a section when viewed from the width direction of the vehicle is closed.

Figure 2:
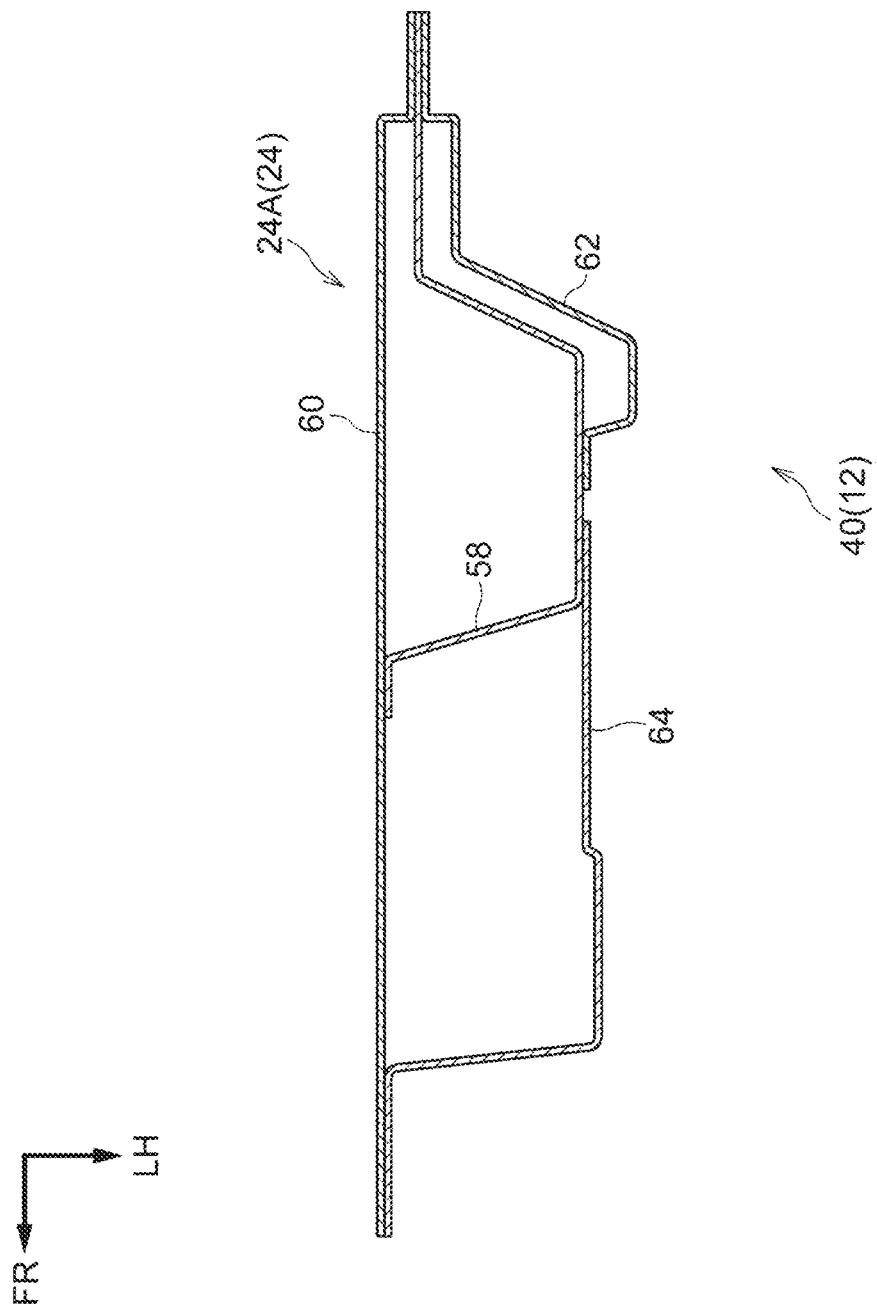
FIG. 2 is a sectional view (a sectional view taken along a line 2-2 in FIG. 6) schematically showing a configuration around a pillar portion in a vehicle body of the vehicle to which the vehicle occupant restraint structure according to the embodiment is applied, as viewed from an up-down direction of the vehicle.

As shown in FIG. 6, the first pillar portion 24 partially constitutes a side portion 40 on one side in the width direction of the vehicle (the left side in the width direction of the vehicle), and is located at a boundary portion between the driver compartment 16 and the passenger compartment 18 when viewed from the width direction of the vehicle. The first pillar portion 24 extends in the up-down direction of the vehicle. As shown in FIGS. 2 and 4, the first pillar portion 24 includes a pillar outer part 58 constituting an outer portion of the first pillar portion 24 in the width direction of the vehicle and a pillar inner part 60 constituting an inner portion of the first pillar portion 24 in the width direction of the vehicle.

The first pillar portion 24 has a closed sectional structure in which a section when viewed from the up-down direction of the vehicle is closed.

As shown in FIGS. 3 and 4, an end portion of the pillar outer part 58 on the vehicle upper side is joined to the roof side rail lower part 38 at a joint portion (not shown) by welding, etc., and an end portion of the pillar outer part 58 on the vehicle lower side is joined to the rocker panel outer part 54 at a joint portion (not shown) by welding, etc.

An end portion of the pillar inner part 60 on the vehicle upper side is joined to the upper cross portion 32 at a joint portion (not shown) by welding, etc., and a portion of the pillar inner part 60 on the vehicle lower side is integrated with the rocker panel inner part 56. Further, an outer end portion of the lower cross portion 52 in the vehicle width direction is joined to the portion of the pillar inner part 60 on the vehicle lower side at a joint portion (not shown) by welding, etc. In FIG. 3, the pillar inner part 60 is shown by a chain double-dashed line in order to make it easier to understand the configuration of the roof side rail 30 and other parts.

Returning to FIG. 2, a portion of a lower portion 24A of the first pillar portion 24 on the vehicle rear side is covered externally by a first side outer panel 62 in the width direction of the vehicle. The first side outer panel 62 constitutes an outer portion in the width direction of the vehicle of a portion on the passenger compartment 18 side of the side portion 40. The first side outer panel 62 is joined to the pillar outer part 58 at a joint portion (not shown) by welding, etc.

A portion of the lower portion 24A on the vehicle front side is covered externally by a second side outer panel 64 in the width direction of the vehicle. The second side outer panel 64 constitutes an outer portion in the width direction of the vehicle of the portion on the driver compartment 16 side of the side portion 40. The second side outer panel 64 is joined to the pillar outer part 58 at a joint portion (not shown) by welding, etc. In FIG. 6, the first side outer panel 62 and the second side outer panel 64 are not shown in order to make it easier to understand the configuration of the first pillar portion 24 and other parts.

The second pillar portion 26 partially constitutes a side portion 41 on the other side in the width direction of the vehicle (the right side in the width direction of the vehicle), and has basically the same configuration as the first pillar portion 24. Further, the upper cross portion 32 and the lower cross portion 52 are joined to the second pillar portion 26 in the same manner as the upper cross portion 32 and the lower cross portion 52 are joined to the first pillar portion 24. With this configuration, as shown in FIGS. 1 and 6, the boundary portion between the driver compartment 16 and the passenger compartment 18 has an annular structural portion 66 that has an annular shape when viewed from the front-rear direction of the vehicle. The annular structural portion 66 includes the first pillar portion 24, the second pillar portion 26, the upper cross portion 32, and the lower cross portion 52.

Here, the vehicle occupant restraint structure according to the embodiment is characterized by the configuration inside the driver compartment 16. Hereinafter, the configuration inside the driver compartment 16 that constitutes a main portion of the embodiment will be described in detail.

As shown in FIG. 1, a vehicle seat 70 (hereinafter referred to as a seat 70), a seat support portion 72 as a support portion, and a restraint device 74 are provided inside the driver compartment 16. A driver (occupant) 68 can be seated on the seat 70. The restraint device 74 can restrain the driver 68. The partition portion 76 is provided on the vehicle rear side with respect to the driver compartment 16.

Figure 5:
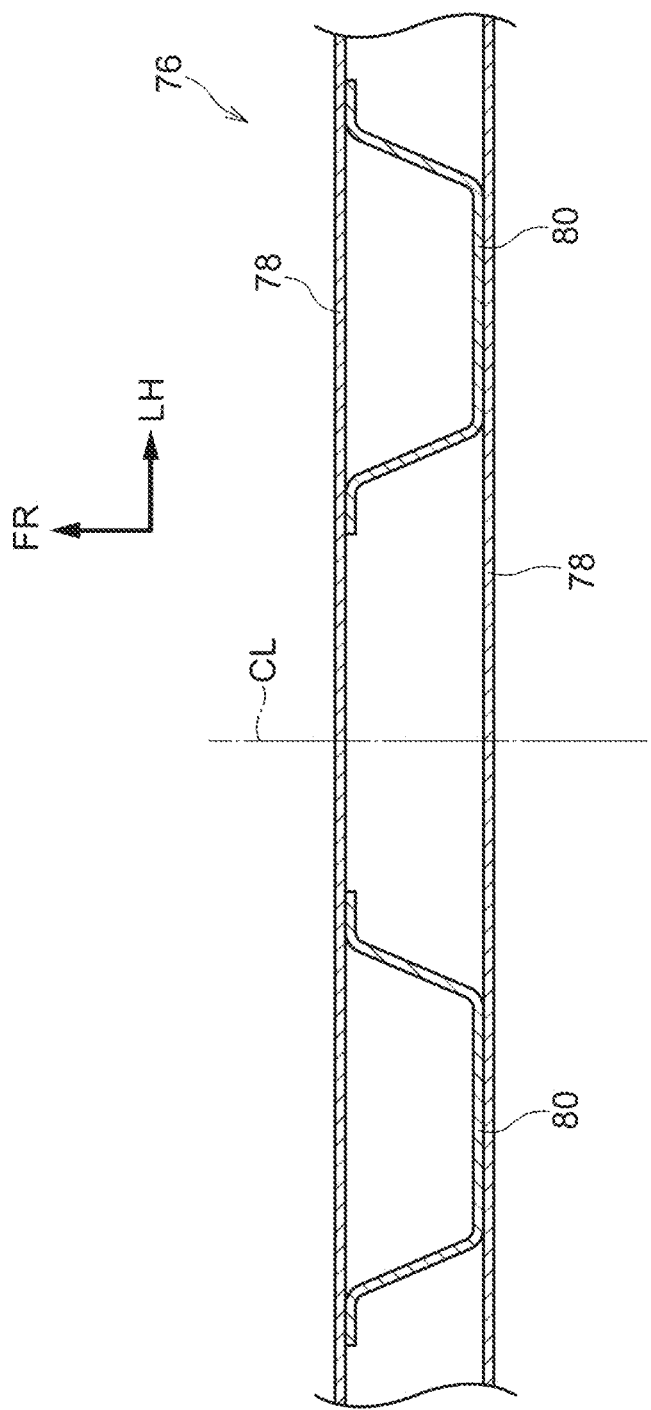
FIG. 5 is a sectional view schematically showing a configuration around a partition portion in the vehicle body of the vehicle to which the vehicle occupant restraint structure according to the embodiment is applied, as viewed from the up-down direction of the vehicle (a sectional view taken along a line 5-5 in FIG. 1)

As shown in FIGS. 1 and 5, the partition portion 76 is disposed between the first pillar portion 24 and the second pillar portion 26 when viewed from the front-rear direction of the vehicle, and is also configured to include a pair of partition panels 78, a pair of reinforcement members 80, a plurality of upper support brackets 82, and a plurality of lower support brackets 88.

The partition panels 78 each have a rectangular plate shape extending in the width direction and the up-down direction of the vehicle when viewed from the front-rear direction of the vehicle, and are disposed at intervals in the front-rear direction of the vehicle with respect to each other. Further, the partition panel 78 on the vehicle front side is located on the vehicle rear side with respect to the upper cross portion 32 and the lower cross portion 52.

The reinforcement members 80 each extend in the up-down direction of the vehicle, and have a hat shape in which a sectional shape when viewed from the up-down direction of the vehicle is open upward in the vehicle. The reinforcement members 80 are disposed at intervals so as to be symmetrical with respect to the central line CL from each other when viewed from the front-rear direction of the vehicle, and are joined to the partition panels 78 at joint portions (not shown) by welding, etc., in a state where the reinforcement members 80 are interposed between the partition panels 78.

The upper support brackets 82 are disposed at predetermined intervals along an end portion, on the vehicle upper side, of the partition panel 78 on the vehicle front side. The upper support brackets 82 each include a joint piece portion 82A and a mounting piece portion 82B to be configured in an L shape when viewed in the width direction of the vehicle.

More specifically, the joint piece portion 82A is disposed along the partition panel 78 and is joined to the partition panel 78 at a joint portion (not shown) by welding, etc. The mounting piece portion 82B is disposed along a bottom wall portion 32C of the upper cross portion 32. The mounting piece portion 82B is attached to the upper cross portion 32 using a weld nut 84 provided on a surface of the bottom wall portion 32C on the vehicle upper side and a bolt 86 fastened to the weld nut 84 from below in the vehicle.

The lower support brackets 88 are disposed at predetermined intervals along an end portion, on the vehicle lower side, of the partition panel 78 on the vehicle front side. The lower support brackets 88 each include a joint piece portion 88A and a mounting piece portion 88B to be configured in an L shape when viewed in the width direction of the vehicle.

More specifically, the joint piece portion 88A is disposed along the partition panel 78 and is joined to the partition panel 78 at a joint portion (not shown) by welding, etc. The mounting piece portion 88B is disposed along the center floor panel 48. The mounting piece portion 88B is attached to the center floor panel 48 and the lower cross portion 52 using a weld nut 90 provided on a surface, on the vehicle lower side, of the flange portion 52A on the vehicle rear side with respect to the lower cross portion 52 and a bolt 92 fastened to the weld nut 90 from above in the vehicle.

That is, the partition portion 76 is provided to bridge between the roof panel 28 and the center floor panel 48 in the up-down direction of the vehicle through the upper cross portion 32 on the vehicle upper side. Further, the partition portion 76 can be regarded to connect the roof panel 28 and the center floor panel 48 in the up-down direction of the vehicle.

As shown in FIG. 1, the seat 70 includes a seat cushion 94, a seat back 96, a head restraint 98, and a pair of seat rails 100 that allows the seat cushion 94 to be slidably movable in the front-rear direction of the vehicle. The seat 70 is disposed above the front floor portion 22A in the vehicle, and is located on the center side of the cabin 14 in the width direction of the vehicle as shown in FIG. 6. More specifically, the center of the seat 70 in the width direction of the vehicle is located on the central line CL when viewed from the up-down direction of the vehicle. The seat 70 is supported by the seat support portion 72 from below in the vehicle.

The seat support portion 72 includes a pair of front support portions 102 and a pair of rear support portions 104. The front support portions 102 are made of channel steel and extend from the cross member 46 upward in the vehicle.

An end portion of each of the front support portions 102 on the vehicle lower side is fixed to an upper wall 46B of the cross member 46 using a fixing member (not shown). An end portion of each of the seat rails 100 on the vehicle front side is fixed to an end portion of the corresponding front support portion 102 on the vehicle upper side using a fixing member (not shown).

The rear support portions 104 each include an upper wall portion 104A having a plate thickness direction being the up-down direction of the vehicle, a pair of side wall portions 104B having a plate thickness direction being the width direction of the vehicle, and a rear wall portion 104C having a plate thickness direction being the front-rear direction of the vehicle. The rear support portions 104 each have a box shape in which the vehicle front side and the vehicle lower side are open.

The rear wall portions 104C are each fixed to the partition portion 76 using a weld nut 106 provided on a surface, on the vehicle rear side, of the partition panel 78 on the vehicle front side and a bolt 108 fastened to the weld nut 106 from front in the vehicle. Further, an end portion of the seat rail 100 on the vehicle rear side is fixed to the corresponding upper wall portion 104A using a fixing member (not shown).

The restraint device 74 is a so-called three-point seatbelt device, and includes a webbing 110, a retractor 112, a tongue plate 114, a buckle 116, a lower anchor 118, and a shoulder anchor 120.

The webbing 110 is wound around a retractor 112 when not in use, and is withdrawn from the retractor 112 when in use such that the driver 68 can be restrained.

The retractor 112 is disposed on the left side of the seat 70 in the width direction of the vehicle and is fixed to the partition portion 76 using a fixing member (not shown). As described above, the webbing 110 can be wound around the retractor 112 in such a manner that the webbing 110 is withdrawable and stored in the retractor 112. Further, when a collision load is input to the vehicle 10, the retractor 112 restricts withdrawal of the webbing 110.

The tongue plate 114 is attached to the webbing 110 as the webbing 110 is inserted into the tongue plate 114, and is also engageable with the buckle 116.

The buckle 116 is attached to a side wall portion 104B on the right side in the width direction of the vehicle in the rear support portion 104 on the right side in the width direction of the vehicle, and the tongue plate 114 can be attached to and detached from the buckle 116.

The lower anchor 118 is provided at an end portion of the webbing 110 and is attached to a side wall portion 104B on the left side in the width direction of the vehicle in the rear support portion 104 on the left side in the width direction of the vehicle.

The shoulder anchor 120 is disposed above the retractor 112 in the vehicle and on the left side of the head restraint 98 in the width direction of the vehicle. The shoulder anchor 120 is fixed to the partition portion 76 using a fixing member (not shown). The webbing 110 withdrawn from the retractor 112 is inserted into the shoulder anchor 120. That is, in the embodiment, the webbing 110 is withdrawable from the partition portion 76 side.

Then, in the restraint device 74 configured as described above, when the collision load is input to the vehicle 10, a load acting on the webbing 110 from the driver 68 is supported by the partition portion 76.

Actions and Effects of Embodiment

Next, actions and effects of the embodiment will be described.

In the embodiment, as shown in FIG. 1, the seat 70 is disposed in the cabin 14, and the driver 68 is seated on the seat 70. The driver 68 seated on the seat 70 is restrained by the restraint device 74.

In the configuration in which the webbing 110 of the restraint device 74 is withdrawn from the side portion 40 side of the vehicle body 12, the seat 70 needs to be disposed in the vicinity of the side portion 40 of the vehicle body 12. Accordingly, it becomes difficult to ensure the flexibility to lay out the position of the seat 70.

Here, in the embodiment, the partition portion 76 that partitions the cabin 14 in the front-rear direction of the vehicle is disposed on the vehicle rear side with respect to the seat 70. The restraint device 74 is partially attached to the partition portion 76, and the webbing 110 of the restraint device 74 is withdrawn from the partition portion 76 side.

Therefore, even when the seat 70 is distant away from the side portion 40 of the vehicle body 12, the driver 68 seated on the seat 70 can be restrained by the webbing 110 of the restraint device 74. Therefore, in the embodiment, the driver 68 seated on the seat 70 can be restrained while ensuring the flexibility to lay out the position of the seat 70.

Further, in the embodiment, the partition portion 76 is provided to bridge between the roof panel 28 constituting the portion of the cabin 14 on the vehicle upper side and the center floor panel 48 constituting the portion of the cabin 14 on the vehicle lower side. Therefore, the load input from the seat 70 side via the restraint device 74 is transmitted to the roof panel 28 and the center floor panel 48 via the partition portion 76.

Further, in the embodiment, as shown in FIG. 6, the first pillar portion 24 extending in the up-down direction of the vehicle is disposed on the one side of the partition portion 76 in the width direction of the vehicle, and the second pillar portion 26 extending in the up-down direction of the vehicle is disposed on the other side of the partition portion 76 in the width direction of the vehicle.

Further, as shown in FIG. 3, the roof panel 28 is reinforced by the upper cross portion 32 extending in the width direction of the vehicle, and the upper cross portion 32 is attached to the first pillar portion 24 and the second pillar portion 26 directly or via members.

As shown in FIG. 4, the center floor panel 48 is reinforced by the lower cross portion 52 extending in the width direction of the vehicle, and the lower cross portion 52 is directly connected to the first pillar portion 24 and the second pillar portion 26. Therefore, the cabin 14 is configured to include the annular structural portion 66 that has an annular shape when viewed from the front-rear direction of the vehicle.

Here, in the embodiment, the partition portion 76 and the annular structural portion 66 as described above are continuous, and an inertial force generated for the driver 68 is applied to and supported by the annular structural portion 66 via the restraint device 74 and the partition portion 76. Therefore, in the embodiment, the driver 68 seated on the seat 70 can be restrained by the restraint device 74 in a stable state.

In addition, in the embodiment, as shown in FIG. 6, the seat 70 is disposed on the center side of the cabin 14 in the width direction of the vehicle, and the seat 70 is supported by the seat support portion 72 with respect to the partition portion 76. Further, the restraint device 74 includes the retractor 112 that allows the webbing 110 to be withdrawn, and the buckle 116 that allows the tongue plate 114 provided on the webbing 110 to be engaged. The retractor 112 is attached to the partition portion 76, and the buckle 116 is attached to the seat support portion 72.

With this configuration, in the embodiment, even when the seat 70 is disposed on the center side of the cabin 14 in the width direction of the vehicle, the retractor 112 and the buckle 116 of the restraint device 74 are disposed in the vicinity of the seat 70 such that the webbing 110 of the restraint device 74 can restrain the occupant seated on the vehicle seat in a stable state. Therefore, in the embodiment, the driver 68 seated on the seat 70 can be restrained by the restraint device 74 in a stable state in the configuration in which the vehicle seat is disposed on the center side of the cabin in the width direction of the vehicle.

Supplementary Explanation of Embodiment (1) In the embodiment above, the retractor 112 is attached to the partition portion 76. However, the location where the retractor 112 is disposed is not limited to this. That is, the retractor 112 may be built in the seat back 96 of the seat 70 so as to reduce the number of parts to be attached to the vehicle body 12.

(2) In the embodiment above, the buckle 116 is attached to the rear support portion 104 of the seat support portion 72. However, the location where the buckle 116 is disposed is not limited to this. That is, the buckle 116 may be attached to the seat 70 in accordance with the specifications of the vehicle 10 and the configuration of the vehicle body 12, for example.

(3) In the embodiment above, the seat 70 is connected to the partition portion 76 via members. However, the configuration of the seat 70 is not limited to this. That is, the seat 70 may be directly connected to the partition portion 76 so as to reduce the number of parts in accordance with the specifications of the vehicle 10 and the configuration of the vehicle body 12, for example.

(4) Further, in the embodiment above, the partition portion 76 is connected to the roof panel 28 via the upper cross portion 32. However, the configuration of the partition portion 76 is not limited to this. That is, the partition portion 76 may be directly connected to the roof panel 28 such that the load can be directly transmitted between the partition portion 76 and the roof panel 28 in accordance with the specifications of the vehicle 10, for example.

(5) In addition, in the embodiment above, the seat 70 is disposed on the center side of the cabin 14 in the width direction of the vehicle. However, the position of the seat 70 is not limited to this. That is, the position of the seat 70 can be set to any position in accordance with the specifications of the vehicle 10, for example, within a range in which the center of the seat in a width direction thereof is closer to the central line CL than the side portions 40, 41 of the vehicle body 12.

What is claimed is:

1. A vehicle occupant restraint structure, comprising:
   a vehicle seat provided in a cabin of a vehicle, the vehicle seat being a driver seat;
   a partition portion that is disposed on a vehicle rear side with respect to the vehicle seat and partitions the cabin in a front-rear direction of the vehicle; and
   a restraint device that is partially attached to the partition portion, includes a webbing that is withdrawable from a side of the partition portion, and allows an occupant seated on the vehicle seat to be restrained, the occupant being a driver,
   wherein
   the vehicle seat is disposed on a center side of the cabin in a width direction of the vehicle,
   the vehicle occupant restraint structure further comprises a support portion that supports the vehicle seat with respect to the partition portion,
   the restraint device includes a retractor and a buckle, the retractor being attached to the partition portion and from which the webbing is withdrawable, and the buckle allowing a tongue plate provided on the webbing to be engaged and being attached to the vehicle seat or the support portion,
   the partition portion includes a partition panel that has a plate shape extending in the width direction and in an up-down direction of the vehicle, and the partition panel is provided to bridge between a roof panel and a floor panel in the up-down direction of the vehicle, the roof panel constituting an upper portion of the cabin on a vehicle upper side, and the floor panel constituting a lower portion of the cabin on a vehicle lower side,
   the restraint device is partially attached to the partition panel,
   the partition panel partitions the cabin into a driver compartment and a passenger compartment,
   the vehicle seat is included in the driver compartment,
   the restraint device is a three-point seatbelt device having the retractor, the buckle, and a shoulder anchor, and
   the retractor and the shoulder anchor are fixed to the partition panel.

2. The vehicle occupant restraint structure according to claim 1, further comprising: wherein
   a first pillar portion that is disposed on a first side of the partition portion in the width direction of the vehicle and extends in the up-down direction of the vehicle,
   a second pillar portion that is disposed on a second side of the partition portion in the width direction of the vehicle and extends in the up-down direction of the vehicle,
   an upper cross portion that is connected to the first pillar portion and the second pillar portion directly or via first members, extends in the width direction of the vehicle, and reinforces the roof panel, and
   a lower cross portion that is connected to the first pillar portion and the second pillar portion directly or via second members, extends in the width direction of the vehicle, and reinforces the floor panel.

3. The vehicle occupant restraint structure according to claim 1, further comprising a reinforcement member that reinforces the partition panel and extends in the up-down direction of the vehicle,
   wherein the reinforcement member constitutes, with the partition panel, a closed sectional structure in which a section as viewed in the up-down direction of the vehicle is closed and that extends in the up-down direction of the vehicle.

4. The vehicle occupant restraint structure according to claim 1, wherein
the partition portion has a further partition panel, and
the partition panel and the further partition panel are disposed at an interval from each other in the front-rear direction of the vehicle.

5. The vehicle occupant restraint structure according to claim 4, wherein
the partition panel and the further partition panel define a pair of partition panels that partitions the cabin into the driver compartment and the passenger compartment.

6. The vehicle occupant restraint structure according to claim 5, further comprising a reinforcement member that reinforces the pair of partition panels, wherein
the reinforcement member is sandwiched, in the front-rear direction, between the pair of partition panels and extends in the up-down direction of the vehicle.

7. The vehicle occupant restraint structure according to claim 1, wherein
the support portion includes a pair of front support portions and a pair of rear support portions,
an end portion of each of the pair of front support portions on the vehicle lower side is configured to be fixed to a cross member of the vehicle,
each of the pair of rear support portions includes a rear wall portion having a plate thickness direction being the front-rear direction of the vehicle,
each of the rear wall portions is fixed to the partition panel, and
a lower end of the buckle is attached to one of the pair of rear support portions.

8. A vehicle occupant restraint structure, comprising:
a vehicle seat provided in a cabin;
a partition portion that is disposed on a vehicle rear side with respect to the vehicle seat and partitions the cabin in a front-rear direction of a vehicle; and
a restraint device that is partially attached to the partition portion, includes a webbing that is withdrawable from a side of the partition portion, and allows an occupant seated on the vehicle seat to be restrained, wherein the partition portion is provided to bridge between a roof panel and a floor panel in an up-down direction of the vehicle, the roof panel constituting an upper portion of the cabin on a vehicle upper side and the floor panel constituting a lower portion of the cabin on a vehicle lower side, the vehicle occupant restraint structure further comprises:
a first pillar portion that is disposed on a first side of the partition portion in a width direction of the vehicle and extends in the up-down direction of the vehicle,
a second pillar portion that is disposed on a second side of the partition portion in the width direction of the vehicle and extends in the up-down direction of the vehicle,
an upper cross portion that is connected to the first pillar portion and the second pillar portion directly or via first members, extends in the width direction of the vehicle, and reinforces the roof panel, and
a lower cross portion that is connected to the first pillar portion and the second pillar portion directly or via second members, extends in the width direction of the vehicle, and reinforces the floor panel, the vehicle occupant restraint structure comprises an annular structural portion that has an annular shape when viewed from the front-rear direction of the vehicle, the annular structural portion including the first pillar portion, the second pillar portion, the upper cross portion, and the lower cross portion, and the upper cross portion overlaps the lower cross portion in the up-down direction of the vehicle.

\* \* \* \* \*